United States Patent
Feng et al.

(10) Patent No.: US 8,087,975 B2
(45) Date of Patent: Jan. 3, 2012

(54) COMPOSITE SHEET FOR MOUNTING A WORKPIECE AND THE METHOD FOR MAKING THE SAME

(75) Inventors: Chung-Chih Feng, Kaohsiung (TW); I-Peng Yao, Kaohsiung (TW); Lyang-Gung Wang, Kaohsiung (TW); Zong-Yao Ku, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 196 days.

(21) Appl. No.: 12/478,228

(22) Filed: Jun. 4, 2009

(65) Prior Publication Data

US 2009/0252949 A1 Oct. 8, 2009

Related U.S. Application Data

(63) Continuation-in-part of application No. 11/790,963, filed on Apr. 30, 2007, now abandoned.

(51) Int. Cl.
*B24B 29/00* (2006.01)
*B32B 3/26* (2006.01)

(52) U.S. Cl. .......... 451/307; 451/41; 451/533; 451/487; 428/316.6; 428/131; 428/317.7

(58) Field of Classification Search ............... 428/316.6, 428/131, 317.7; 451/41, 533, 487, 307
See application file for complete search history.

(56) References Cited

U.S. PATENT DOCUMENTS

| | | | |
|---|---|---|---|
| 4,512,113 A | 4/1985 | Budinger | |
| 4,841,680 A | 6/1989 | Hoffstein et al. | |
| 5,538,465 A | 7/1996 | Netsu et al. | |
| 5,604,021 A * | 2/1997 | Wagner | 428/218 |
| 5,871,393 A | 2/1999 | Shiozawa | |
| 5,906,887 A | 5/1999 | Withers | |
| 6,117,776 A | 9/2000 | Huber et al. | |
| 6,419,573 B1 | 7/2002 | Lise et al. | |
| 7,316,605 B1 | 1/2008 | Feng et al. | |
| 2004/0259484 A1* | 12/2004 | Prasad et al. | 451/287 |
| 2005/0221723 A1* | 10/2005 | Duboust et al. | 451/41 |
| 2007/0212986 A1 | 9/2007 | Priewasser | |
| 2008/0200105 A1* | 8/2008 | Feng et al. | 451/460 |
| 2011/0045744 A1* | 2/2011 | Feng et al. | 451/41 |

FOREIGN PATENT DOCUMENTS

| | | |
|---|---|---|
| TW | 558481 | 10/2003 |
| TW | 200510114 | 3/2005 |
| TW | I245337 | 12/2005 |
| TW | 200706308 | 2/2007 |

OTHER PUBLICATIONS

Taiwanese Office Action dated Sep. 17, 2010 for TW096115357, which is a corresponding Taiwanese application, that cites TW200510114, US4512113, TWI245337, TW558481, and TW200706308.

* cited by examiner

*Primary Examiner* — Hai Vo
(74) *Attorney, Agent, or Firm* — WPAT, P.C.; Anthony King

(57) ABSTRACT

The present invention relates to a composite sheet for mounting a workpiece and a method for making the same. The composite sheet includes a buffer layer and an adsorption layer. The buffer layer has a plurality of continuous pores. The adsorption layer is located on the buffer layer for adsorbing a workpiece, and the compression ratio of the buffer layer is higher than that of the adsorption layer. Thereby, due to low hardness, good adsorption effect, and high compression ratio, the composite sheet of the present invention has good buffer effect.

11 Claims, 4 Drawing Sheets

COMPOSITE SHEET FOR MOUNTING A WORKPIECE AND THE METHOD FOR MAKING THE SAME

CROSS-REFERENCE TO RELATED APPLICATIONS

This application is a continuation-in-part of copending application Ser. No. 11/790,963 filed Apr. 30, 2007 claims the benefit thereof and incorporates the same by reference.

BACKGROUND OF THE INVENTION

1. Field of the Invention

The present invention relates to an adsorption sheet and a method for making the same, and more particularly, to a composite adsorption sheet for mounting a workpiece and a method for making the same.

2. Description of the Related Art

Polishing generally refers to abrasion control of an originally rough surface in a chemical mechanical polishing (CMP) process, in which a slurry containing fine particles is uniformly distributed on an upper surface of a polishing pad, and a polishing workpiece is pressed against the polishing pad to be polished regularly in a repeated pattern. The polishing workpiece is, for example, semiconductor, storage medium substrate, integrated circuit, LCD flat panel glass, optical glass, and photoelectric panel. During the polishing, it is necessary to use a sheet to support and mount the polishing workpiece, and the quality of the sheet directly affects the polishing effect of the polishing workpiece.

FIG. 1 is a schematic diagram of a polishing equipment having a conventional sheet disclosed in U.S. Pat. No. 5,871,393. The polishing equipment 1 includes a lower base plate 11, a sheet 12, a polishing workpiece 13, an upper base plate 14, a polishing pad 15, and slurry 16. The lower base plate 11 is opposite to the upper base plate 14. The sheet 12 is adhered onto the lower base plate 11 with a back adhesive layer 17, and is used to support and mount the polishing workpiece 13. The polishing pad 15 is mounted on the upper base plate 14 and facing the lower base plate 11, for polishing the polishing workpiece 13.

The polishing equipment 1 operates as follows. Firstly, the polishing workpiece 13 is disposed on the sheet 12, and is adsorbed by the sheet 12. Next, the upper base plate 14 and the lower base plate 11 are rotated in opposite directions, and meanwhile, the upper base plate 14 moves downward, so as to make the polishing pad 15 contact the surface of the polishing workpiece 13. In this way, the polishing workpiece 13 is polished by continuously supplementing the slurry 16 together with the function of the polishing pad 15.

FIG. 2 is a schematic enlarged diagram of region A in FIG. 1. The region A mainly shows the sheet 12. The sheet 12 is a single-layered structure, and the material thereof is generally polyurethane (PU) resin, which is a foam material. Furthermore, the sheet 12 has a plurality of communicating foam pores 121 inside.

During the polishing process, the polishing workpiece 13 and the sheet 12 bear a downward pressure, and the compression ratio of the sheet 12 may affect the overall stress uniformity, which is also a critical factor in determining the flatness of the polishing workpiece 13 after being polished. That is, high compression ratio represents good buffer effect, such that the polishing workpiece 13 after the polishing may acquire good flatness. In general, after long-term usage, the compression ratio of the sheet 12 will gradually descend to end the life of the sheet 12.

As the sheet 12 is a single-layer structure, if the material thereof is soft, though the adsorption to the polishing workpiece 13 is strong, the compression ratio is low; while if the material thereof is hard, though the compression ratio is high, the adsorption to the polishing workpiece 13 is weak.

Therefore, it is necessary to provide a composite sheet for mounting a workpiece and a method for making the same to solve the above problems.

SUMMARY OF THE INVENTION

The objective of the present invention is to provide a composite sheet, which includes a buffer layer and an adsorption layer. The buffer layer has a plurality of continuous pores. The adsorption layer is located on the buffer layer, for adsorbing a workpiece, and the compression ratio of the buffer layer is higher than that of the adsorption layer. Thereby, a balance between the overall hardness and the compression ratio of the composite sheet is achieved. Moreover, the hardness or compression ratio can be adjusted optionally. Compared with the conventional sheet with a single-layer structure, the composite sheet of the present invention has lower hardness, thus better adsorption effect can be obtained; meanwhile, the composite sheet of the present invention has higher compression ratio, thus better buffer effect can be obtained.

Another objective of the present invention is to provide a method for making a composite sheet, which includes the following steps: (a) forming a resin layer on a carrier; (b) solidifying the resin layer; (c) washing the resin layer; (d) baking the resin layer, to form a buffer layer having a plurality of continuous pores; and (e) attaching an adsorption layer onto the buffer layer, to form a composite sheet, wherein the compression ratio of the buffer layer is higher than that of the adsorption layer.

DETAILED DESCRIPTION OF THE INVENTION

Figure 1:
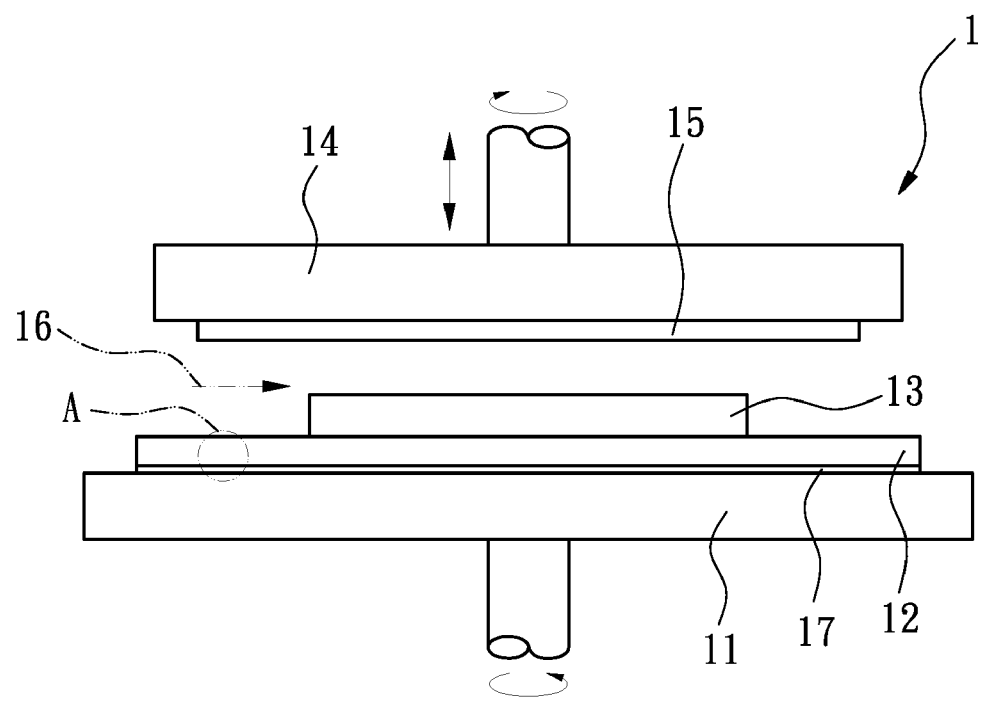
FIG. 1 is a schematic diagram of a polishing equipment having a conventional sheet disclosed in U.S. Pat. No. 5,871,393.
Figure 2:
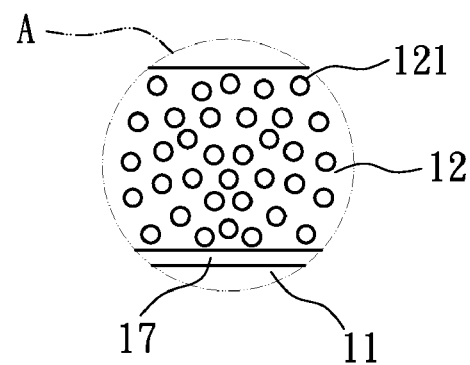
FIG. 2 is a schematic enlarged diagram of region A in FIG. 1.
Figure 3:
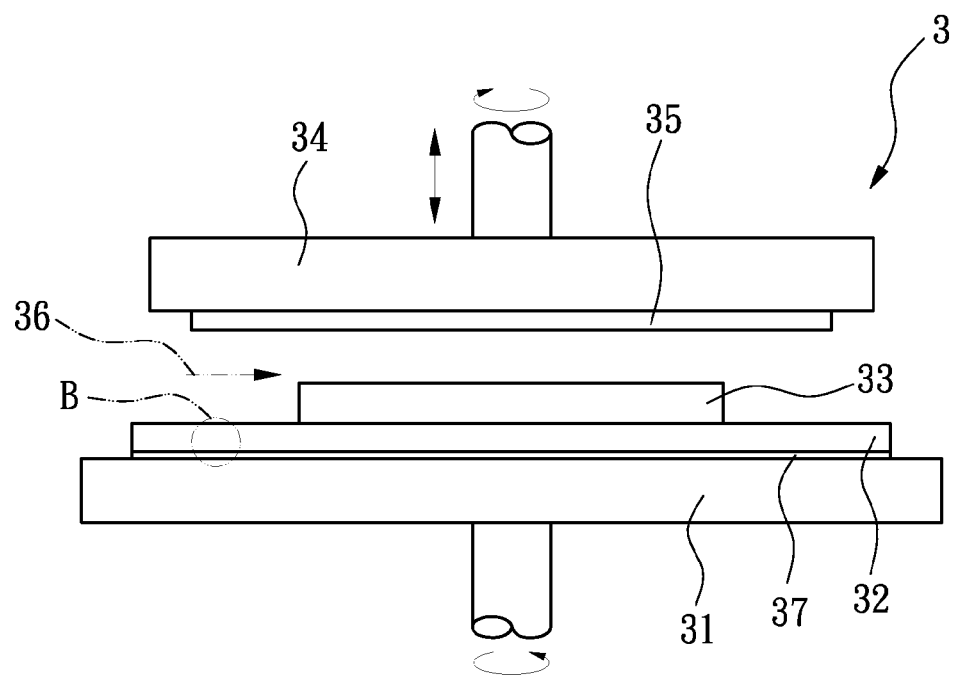
FIG. 3 is a schematic diagram of a polishing equipment of the present invention.

FIG. 3 is a schematic diagram of a polishing equipment of the present invention. The polishing equipment 3 includes a lower base plate 31, a composite sheet 32, a polishing workpiece 33, an upper base plate 34, a polishing pad 35, and a slurry 36. The lower base plate 31 is opposite to the upper base plate 34. The composite sheet 32 is fixed on the lower base plate 31. In this embodiment, the composite sheet 32 is adhered to the lower base plate 31 with a back adhesive layer 37, for supporting and mounting the polishing workpiece 33. The polishing workpiece 33 is selected from a group consisting of semiconductor, storage medium substrate, integrated circuit, LCD flat panel glass, optical glass, and photoelectric panel. The polishing pad 35 is mounted on the upper base plate 34 and facing the lower base plate 31, to polish the polishing workpiece 33.

The polishing equipment 3 operates as follows. Firstly, the polishing workpiece 33 is disposed on the sheet 32, and the polishing workpiece 33 is adsorbed by the sheet 32. Next, the upper base plate 34 and the lower base plate 31 are rotated in opposite directions, and meanwhile, the upper base plate 34 moves downward, so as to make the polishing pad 35 contact the surface of the polishing workpiece 33. In this way, the polishing workpiece 33 is polished by continuously supplementing the slurry 36 together with the function of the polishing pad 35.

Figure 4:
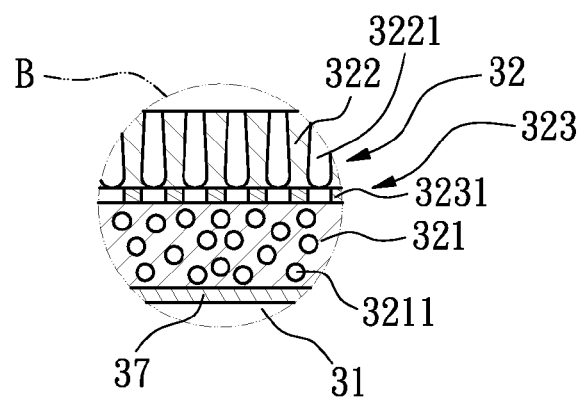
FIG. 4 is a schematic enlarged diagram of region B in FIG. 3.

FIG. 4 is a schematic enlarged diagram of region B in FIG. 3. The region B mainly shows the composite sheet 32. In the present invention, the composite sheet 32 is a double-layered structure including a buffer layer 321 and an adsorption layer 322. The buffer layer 321 has a plurality of continuous pores 3211 that communicate with each other, and the back adhesive 37 is formed on the lower surface of the buffer layer 321. The adsorption layer 322 is different from the buffer layer 321, and is located on the buffer layer 321, for adsorbing the polishing workpiece 33. The adsorption layer 322 has a plurality of holes 3221 that communicate with each other. The compression ratio of the buffer layer 321 is higher than that of the adsorption layer 322. Preferably, the void content of the buffer layer 321 is higher than that of the adsorption layer 322.

In this embodiment, the material of the buffer layer 321 is PU resin with a void content higher than 60%; preferably, higher than 75%. The material of the adsorption layer 322 is Polyurethane (PU) resin, polyvinyl chloride (PVC) resin, polystyrene resin, polyethylene resin, polyamide resin, polypropylene resin, or ethylene-vinyl acetate resin, with a void content of 30%-60%, preferably, 40%-50%. Additionally, the compression ratio of the buffer layer 321 is higher than 30%; preferably, higher than 50%. Such compression ratio can be adjusted optionally. The compression ratio of the adsorption layer 322 is 25%-40%.

In this embodiment, the adsorption layer 322 is attached to the buffer layer 321 with an adhesive layer 323, and the material of the adhesive layer 323 is a polymer elastomer, such as pressure-sensitive adhesive, moisture curable resin, one-component resin, or two-component resin. The adhesive layer 323 has a plurality of adhesive points 3231 to adhere the buffer layer 321 and the adsorption layer 322. The adhesive points 3231 are discontinuous and have gaps therebetween. That is, the adhesive layer 323 is not completely filled between the buffer layer 321 and the adsorption layer 322. The adhesive points 3231 are regularly or irregularly distributed. Therefore, the continuous pores 3211 of the buffer layer 321 can communicate with the holes 3221 of the adsorption layer 322 through the gaps between the adhesive points 3231.

Figure 5:
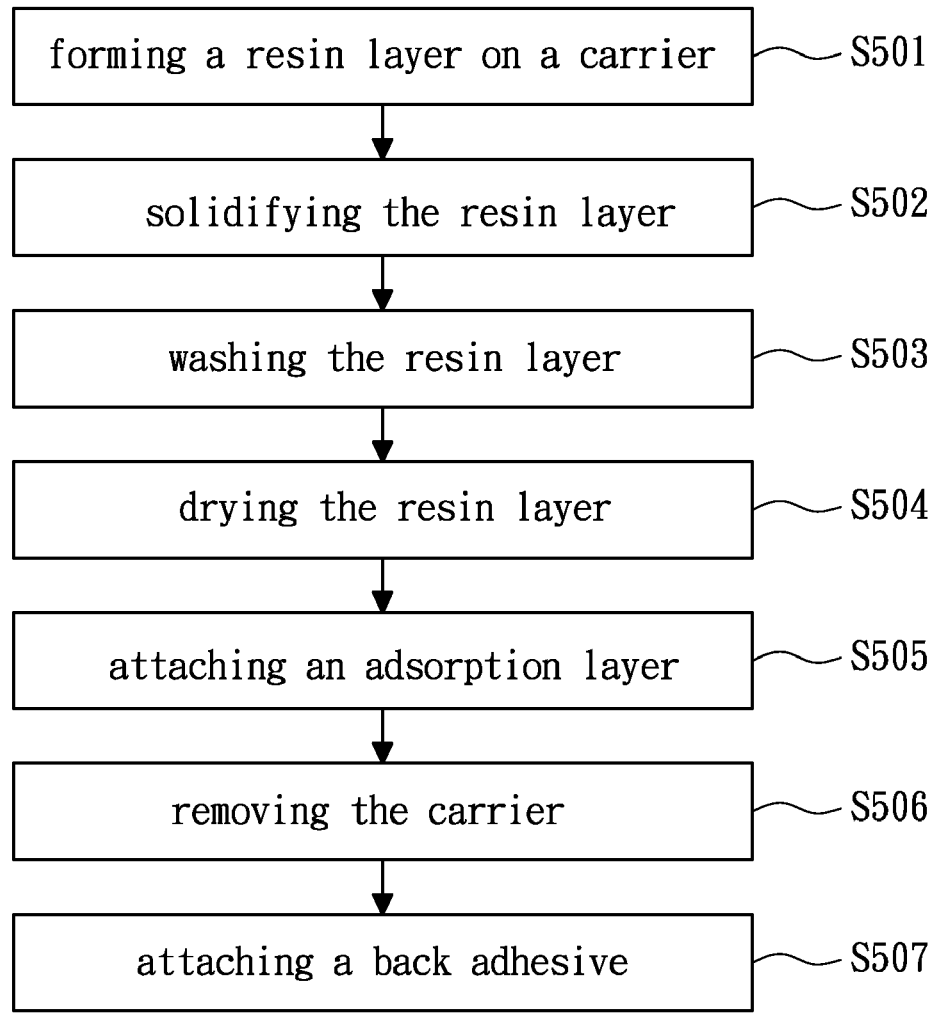
FIG. 5 is a schematic flow chart of a method for making a composite sheet of the present invention.
Figure 6:
FIGS. 6 to 9 are schematic diagrams of each process in the method for making a composite sheet of the present invention.
Figure 7:

FIG. 5 is a schematic flow chart of a method for making a composite sheet of the present invention. The method includes the following steps. Referring to FIG. 6 and FIG. 5, in Step S501, a resin layer 71 is formed on a carrier 72. In this embodiment, the material of the resin layer 71 is PU resin, and the resin layer 71 is formed on the carrier 72 by coating. Afterward, in Step S502, the resin layer 71 is solidified. In Step S503, the resin layer 71 is washed. And in Step S504, the resin layer 71 is dried or baked, so as to form a buffer layer 73, as shown in FIG. 7. The buffer layer 73 has a plurality of continuous pores that communicate with each other.

Figure 8:
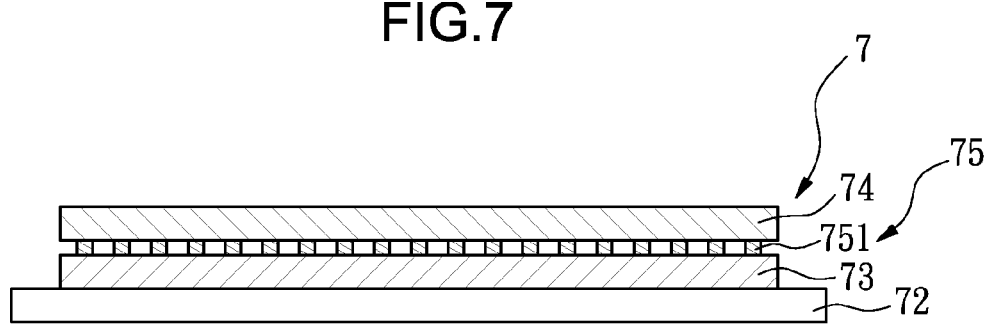

Referring to FIG. 8 and FIG. 5, in Step S505, an adsorption layer 74 is attached to the buffer layer 73, to form a composite sheet 7, wherein the adsorption layer 74 has a plurality of holes that communicate with each other. The compression ratio of the buffer layer 73 is higher than that of the adsorption layer 74, and the void content of the buffer layer 73 is higher than that of the adsorption layer 74. In this embodiment, an adhesive layer 75 is formed with an attachment tool, for attaching the adsorption layer 74 onto the buffer layer 73. The material of the adhesive layer 75 is a polymer elastomer, such as pressure-sensitive adhesive, moisture curable resin, one-component resin, or two-component resin. The attachment tool can be a coating roller, coating blade, printing roller, or transfer tool. The adhesive layer 75 has a plurality of adhesive points 751 to adhere the buffer layer 73 and the adsorption layer 74. The adhesive points 751 are discontinuous and have gaps therebetween. That is, the adhesive layer 75 is not completely filled between the buffer layer 73 and the adsorption layer 75. The adhesive points 751 are regularly or irregularly distributed.

Figure 9:
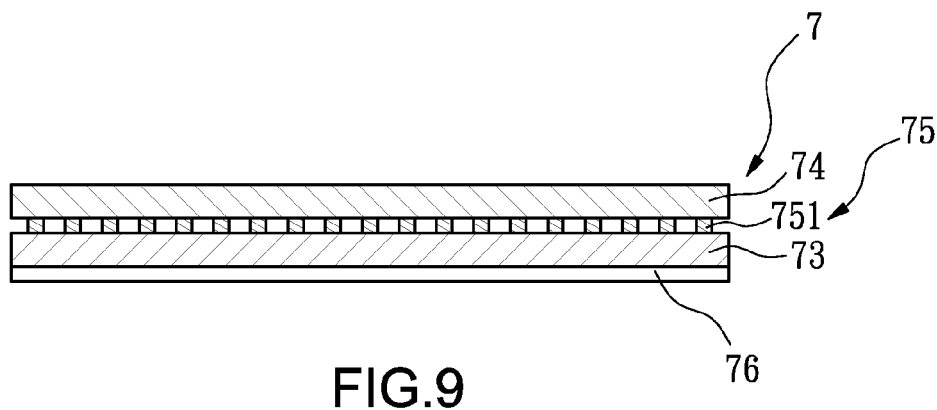

Preferably, after the adsorption layer 74 is attached to the buffer layer 73, these two layers are left still for a day to be cured. Meanwhile, referring to FIG. 9, in Step S506, the carrier 72 is removed, and next, in Step S507, a back adhesive 76 is attached to the lower surface of the buffer layer 73, so as to form a commercialized product of the composite sheet 7.

The present invention will be described in detail with the following examples, but it does not mean that the present invention is limited to the content disclosed by the examples.

EXAMPLE

Firstly, a carrier is provided as a coating substrate, and the carrier can be polypropylene film, polyethylene terephthalate (PET) film, polyacrylic film, polyolefin film, woven fabric, or fiber glass. Additionally, 19.9 wt % of PU resin for coating, 6.6 wt % of colorant, 2.5 wt % of interface agent, and 71 wt % of dimethylformamide (DMF) solvent are mixed uniformly to prepare a coating material. Next, the coating material is coated on the carrier to form a resin layer. Then, the resin layer is solidified in a solidifying tank having 10% of DMF. Afterward, the resin layer is washed, and the water temperature is 60° C. And then, the resin layer is baked at 100° C. to form a continuous porous buffer layer. Thereafter, an adhesive layer of a polymer elastomer is formed on the buffer layer through a printing roller, and an adsorption layer of PU material is attached to the buffer layer to form a composite adhesive sheet. The composite sheet includes a buffer layer, an adsorption layer, and an adhesive layer. The buffer layer has a plurality of continuous pores that communicate with each other. The adsorption layer has a plurality of holes that communicate with each other. The adhesive layer has a plurality of adhesive points (not shown) to adhere the buffer layer and the adsorption layer. The adhesive points are discontinuous and have gaps therebetween. The void content of the buffer layer 93 is 81%, and the compression ratio thereof is 56%. The void content of the adsorption layer 94 is 37%, and the compression ratio thereof is 38%. The hardness of the composite sheet is 18 shore A, and the compression ratio thereof is 49.45%, while the hardness of the conventional sheet is above 20 shore A, and the compression ratio thereof is generally below 40%. Therefore, the composite sheet of this example has lower hardness (i.e., better adsorption effect) and higher compression ratio (i.e., better buffer effect).

In the present invention, as a composite sheet is formed by compositing two different layers, a balance can be achieved between the overall hardness and the compression ratio of the composite sheet, and moreover, the hardness or compression ratio can be adjusted optionally. That is to say, compared with the conventional sheet with a single-layer structure, the composite sheet of the present invention has lower hardness, thus better adsorption effect can be obtained, and meanwhile, the composite sheet of the present invention has higher compression ratio, thus better buffer effect can be obtained.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A polishing equipment, comprising:
   a lower base plate;
   a composite sheet fixed on the lower base plate;
   a polishing workpiece supported and mounted by the composite sheet when polishing;
   an upper base plate opposite to the lower base plate;
   a polishing pad mounted on the upper base plate and facing the lower base plate for polishing the workpiece;
   wherein the composite sheet, comprises:
   a buffer layer having a plurality of continuous pores that communicate with each other; and
   an adsorption layer located on the buffer layer for adsorbing the workpiece, wherein the compression ratio of the buffer layer is higher than that of the adsorption layer, the adsorption layer has a plurality of holes that communicate with each other, and the continuous pores of the buffer layer communicate with the holes of the adsorption layer.

2. The polishing equipment as claimed in claim 1, wherein the workpiece is selected from a group consisting of semiconductor, storage medium substrate, integrated circuit, LCD flat panel glass, optical glass, and photoelectric panel.

3. The polishing equipment as claimed in claim 1, wherein the void content of the buffer layer is higher than that of the adsorption layer.

4. The polishing equipment as claimed in claim 1, wherein the void content of the buffer layer is higher than 60%.

5. The polishing equipment as claimed in claim 1, wherein the compression ratio of the buffer layer is higher than 30%.

6. The polishing equipment as claimed in claim 1, wherein the void content of the buffer layer is between 30%-60%.

7. The polishing equipment as claimed in claim 1, wherein the adsorption layer is attached to the buffer layer with an adhesive layer, the adhesive layer has a plurality of adhesive points to adhere the buffer layer and the adsorption layer, the adhesive points are discontinuous and have gaps therebetween, and the continuous pores of the buffer layer communicate with the holes of the adsorption layer through the gaps.

8. The polishing equipment as claimed in claim 7, wherein the material of the adhesive layer is a polymer elastomer.

9. The polishing equipment as claimed in claim 7, wherein the adhesive layer is selected from a group consisting of pressure-sensitive adhesive, moisture curable resin, one-component resin, and two-component resin.

10. The polishing equipment as claimed in claim 1, wherein the material of the buffer layer is polyurethane (PU) resin.

11. The polishing equipment as claimed in claim 1, which further comprises a back adhesive layer for adhering the composite sheet to the lower base plate.

* * * * *